July 5, 1938.  L. BRODTON  2,122,998
INDICATOR
Filed Nov. 17, 1936
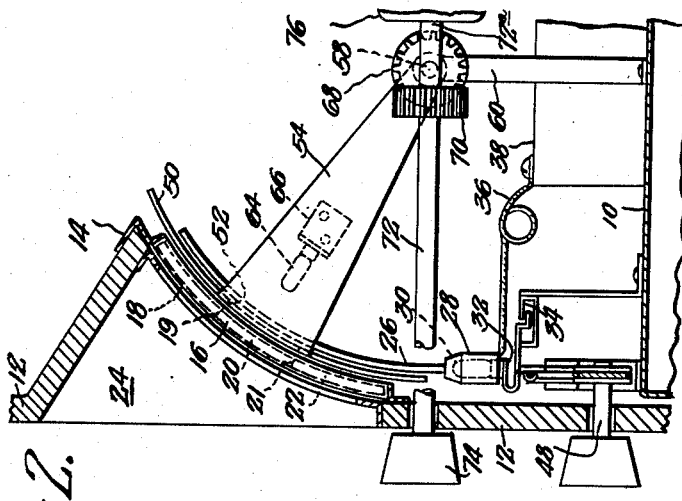
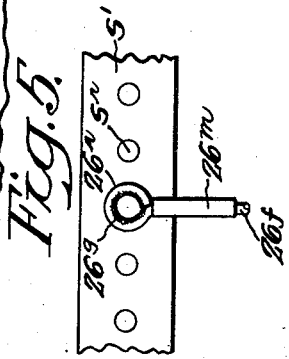
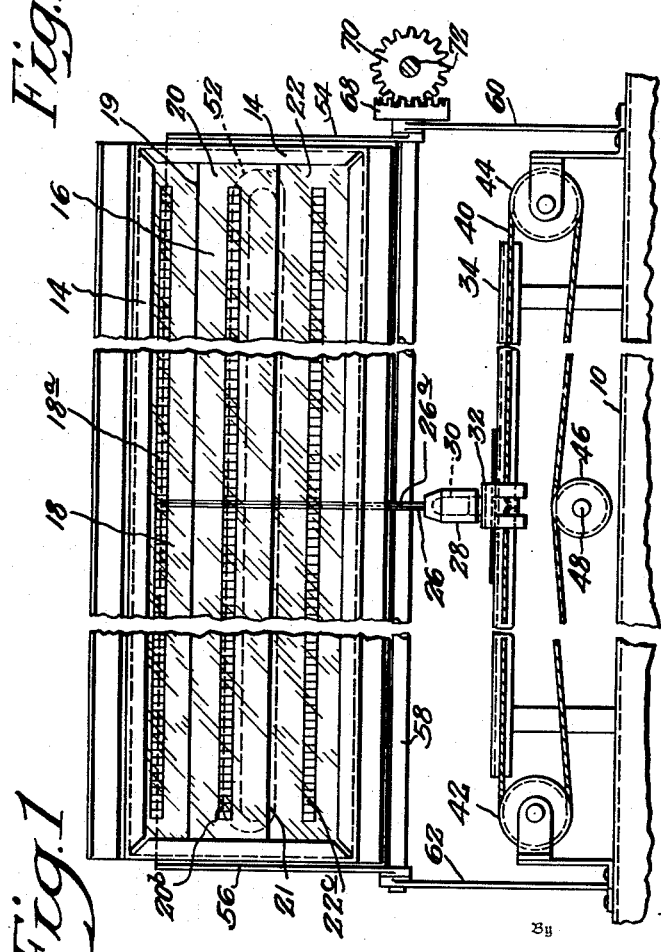
Inventor
Lynn Brodton
By
Attorney Patented July 5, 1938

2,122,998

UNITED STATES PATENT OFFICE 2,122,998

INDICATOR

Lynn Brodton, Collingswood, N. J., assignor to Radio Corporation of America, a corporation of Delaware Application November 17, 1936, Serial No. 111,201

4 Claims. (Cl. 116—124.1)

This invention relates to indicators, and particularly to tuning indicators for radio apparatus.

An object of the invention is to provide a scale and a light-conductive pointer therefor for producing areas of different intensity of illumination on said scale, whereby to indicate areas of "coarse" and "fine" tuning adjustment.

Another object of the invention is to provide means for forming a pencil, ring, or spot of light, and for projecting the same upon a frequency-indicating or like scale.

Another object of the invention is to provide a tuning indicator of novel and pleasing design.

The above and other objects are accomplished in accordance with the invention by the provision of a preferably translucent scale bearing surface and a light-conductive pointer therefor. The pointer, which is preferably of natural or artificial quartz, or like material, is end-illuminated and that portion of its surface which is presented to the scale is etched or otherwise roughened in a desired pattern to bring out and project light from the interior of the pointer, upon the scale. Where a portion only of the pointer surface is etched, the etched portion will be illuminated with maximum intensity and the light about the unetched or stippled area will be of less intensity and constitute a halo about the brilliantly illuminated pattern.

The etched pattern on the pointer preferably corresponds to the pattern of the individual markings on the scale with which the pointer is associated. Thus, assuming the scale indicia to be constituted by a series of straight lines, the pattern etched on the pointer should be a mere line, in which case, accurate tuning is indicated when the brilliantly illuminated line on the pointer is in register with a selected scale marking. In tuning the set the operator will ordinarily be guided by the halo of light surrounding the pointer to a point near the desired scale marking to obtain a "coarse" tuning adjustment, and will then seek to register the brilliantly illuminated line with a selected scale marking to obtain a "fine" tuning adjustment.

Certain details of construction, together with other objects and advantages, will be apparent and the invention itself will be best understood by reference to the following specification and the accompanying drawing, wherein Figure 1 is a front elevation, and Figure 2 is a side elevation of a multi-scale indicator including a pointer constructed in accordance with the principle of the invention, and Figures 3, 4 and 5 are fragmentary perspective views of various forms of pointers which may be used in carrying the invention into effect.

In Figs. 1 and 2, 10 designates the chassis and 12 the front panel of a radio receiver. A frame 14, immovably secured to panel 12, supports a translucent screen which is designated generally by reference numeral 16. Screen 16, in the embodiment illustrated, is constituted by three slat-shape translucent members 18, 20 and 22, formed of glass or like material and joined together along their long edges by interposed layers 19 and 21 of opaque material.

The outer surface of each translucent member carries a preferably linear band scale, designated respectively 18a, 20b and 22c, which may be viewed through a recessed aperture 26, provided for the purpose, in the front panel 12 of the set. The number of translucent members, and hence the number of separate scales, corresponds to the number of frequency ranges or bands to which the radio apparatus is adapted to be tuned—in this embodiment, three. These discrete transparent scale bearing members 18, 20, 22 are so arranged, in the interest of compactness, that their outer surfaces constitute a continuous surface corresponding to a portion of the surface of a polygon. Stated another way, these discrete scale-bearing surfaces may be disposed uniformly about an axis of curvature in separate planes normal to different radii thereof. If desired, however, scale bearing surfaces 18, 20, 22 may be curved to constitute a true arc of a circle, or, if space permits, they may be arranged in a single plane. In any event, the terminal edges of these members preferably lie in a common vertical plane and, except for the edge portions of the interposed layers 19 and 21 of opaque material, are translucent. If desired, each of these translucent members may be formed of differently colored glass, in order to provide a distinctive indication of the particular scale in use.

The pointer for use with the frequency band scale is constituted, in accordance with the invention, of a preferably rod-like member 26 composed of a substance such, for instance, as quartz, "hard" glass, or other suitable material capable of transmitting light.

The pointer is supported by a housing or hood 28 containing a lamp 30. Light from this lamp 30 impinges upon the unobstructed cross-sectional terminal end of the rod and is apparently concentrated in the interior thereof. In order to focus the light from the interior of the glass into a narrow pencil of rays, it is etched or otherwise roughened along that section of the rod adjacent which the rays are to be concentrated. Thus, as shown more clearly in Fig. 3, the pointer 26 has an etched portion 26a extending along its long axis. A novel and pleasing effect is created by the introduction of a film of coloring material over the roughened surface. As indicated at 26b, the free end of the pointer may be silvered to reflect light which might otherwise be dissipated at this point.

Referring to Fig. 4, where a mere spot of light is required, the pointer here designated, 26c, may be bent, as at 26d, during manufacture so that its end surface 26e only is presented to the scale "S" with which it is associated. A line 26', corresponding to the scale markings $S^a$, is etched on that surface of the pointer which lies adjacent the scale S.

The pointer, and hence the visual indication which it gives, may assume any desired form. Thus, referring to Fig. 5, a terminal section of pointer 26f is bent in the form of a ring 26r and serves to illuminate indicia $S^r$ of similar contour carried on a translucent scale S'. Here, as in the other illustrated embodiments, the pointer is etched, as at 26g, to concentrate the light adjacent a portion of its surface. The etching or stippling may be graded, if desired, to produce maximum intensity of light adjacent the inner periphery of the ring 26r. Wherever necessary or desirable, portions of the surface of the pointer not requiring illumination may be masked, as indicated at 26m.

The pointer 26 of Figs. 1 and 2 is curved to conform with the contour of the scale bearing surface 16. The pointer moving mechanism is of a type suitable for use with linear scales. In the illustrated embodiment, the housing 28, supporting the pointer 26 and containing the lamp 30, is mounted on an arm 32 which is slidably carried in a guideway 34. A slack wire 36 connected to a suitable source, indicated generally at 38, supplies current to the lamp 30.

Arm 32 is fixed to a taut, endless cord or chain 40, which is wrapped about the periphery of pulleys 42 and 44 which are supported for rotation adjacent the opposite ends of the scale. The pointer 26 is adapted to be moved across the dial upon movement of a central pulley knob 46, which may conveniently be mounted on the end of the shaft 48 carrying the main tuning elements of the set.

In order to obtain a positive indication of the particular frequency range in use, it is desirable to illuminate the scale specific to such range and to mask those sections of the pointer which lie adjacent the band scales which are not in use. To this end a movable slotted mask 50 is provided intermediate the rear surface of the dial 16 and pointer 26. The mask 50 is constituted of a sheet of light weight opaque material curved to conform with the contour of the dial and pointer and having a central slot 52 therein, the dimensions of which correspond to the dimensions of a single band-scale, whereby light from a source suitably positioned behind the translucent dial will be confined to the scale selected. The mask 50 is supported on a pair of oppositely located arms 54 and 56, which are fixed to a shaft 58, mounted for rotation on a pair of supports 60, 62.

The source of light for illuminating the several scales may be constituted by lamps 64, supported on a bracket 66 secured to arms 54, 56. The lamps, other than the one (30) illuminating the pointer, may be omitted if desired. Whereas, in the embodiment of Figs. 1 and 2 a general source of illumination 64 is provided, its intensity is, of course, not so great as to blanket the indication provided by light rays from the pointer 26.

The mechanism for moving the mask 50 so that the slot 52 therein will register with a particular band-scale may be of any suitable or convenient type. Thus, shaft 58 may be provided with a cup-gear 68 adjacent one end thereof which meshes with a complementary gear 70 carried on a shaft 72 which extends through the front panel 12 of the set and is provided with a control knob 74. Knob 74 likewise controls a suitable wave change switch 76 connected to an extension 72a of shaft 72.

This invention is not intended to be restricted in scope to the specific embodiments shown, but contemplates such modifications as are within the spirit of the appended claims.

What is claimed is:—

1. A indicator comprising a translucent scale-bearing surface of arcuate contour, a pointer formed of light-conductive material curved to conform with the contour of said surface and supported for movement adjacent said surface, means for illuminating said pointer and means for moving said pointer and pointer-illuminating means.

2. A multi-scale indicator comprising a continuous surface constituted by a plurality of scale-bearing members, a pointer presented to said surface and common to said scales, said pointer being formed of a light conducting substance, means for illuminating said surface and said pointer with light of different degrees of intensity, and means interposed between said pointer and said surface for confining light provided by said illuminating means to a selected of said scales.

3. In combination, a translucent scale bearing surface, means for illuminating said surface, a pointer formed of a light conducting substance mounted adjacent said surface, said pointer having a portion of its surface roughened in a pattern similar to the form of the indicia on said scale, means for illuminating said pointer with light of an intensity greater than that provided by said first mentioned illuminating means, whereby to project said pattern upon said surface, and means for moving said pointer to register its pattern with that of the scale indicia.

4. The invention set forth in claim 3 wherein the pattern of the individual indicia on said scale and the light image formed by the roughened portion of said pointer are both of circular contour.

LYNN BRODTON.